United States Patent [19]

Farajun

[11] Patent Number: 4,571,138

[45] Date of Patent: Feb. 18, 1986

[54] APPARATUS FOR SILO CLEAN OUT

[76] Inventor: David Farajun, 31 Clansman Blvd., Willowdale, Ontario, Canada, M2H 1X5

[21] Appl. No.: 598,203

[22] Filed: Apr. 9, 1984

[51] Int. Cl.[4] .............................................. B65G 65/48

[52] U.S. Cl. .................................... 414/323; 414/324

[58] Field of Search ............... 414/304, 305, 313, 314, 414/315, 317, 323, 324, 301; 222/196, 228; 366/286; 15/246.5

[56] References Cited

U.S. PATENT DOCUMENTS

| | | | |
|---|---|---|---|
| 4,132,322 | 1/1979 | Loesch et al. | 414/313 |
| 4,433,707 | 2/1984 | Farnham | 414/301 X |
| 4,444,338 | 4/1984 | Reimbert | 222/228 |

*Primary Examiner*—Robert G. Sheridan

*Attorney, Agent, or Firm*—Sim & McBurney

[57] ABSTRACT

An apparatus for cleaning out material which remains within a confined space, such as silos, hoppers and the like, is disclosed. The apparatus includes a power driven device for impacting the material which is hung up within the silo to loosen it and allow it to fall downwardly of the silo. The device for impacting the material is suspended from and powered by a cable/hose which is reeled onto a drum supported above the material in the silo. The drum is rotatable to payout or rewind the cable/hose in positioning the impacting device in the area of the material to be loosened. The apparatus includes provision for automatically reciprocating the impacting device along the material face and in the event of a material avalanche, releasing the drum to allow the impacting device to fall downwardly with the flowing material.

22 Claims, 7 Drawing Figures

APPARATUS FOR SILO CLEAN OUT

FIELD OF THE INVENTION

This invention relates to apparatus for cleaning out material which remains within a confined space and more particularly as used in cleaning out silos, hoppers and the like.

BACKGROUND OF THE INVENTION

With various types of storage units, such as hoppers, silos and tanks for containing material, a common problem is that by compaction of the material it hangs up in the confined space over extended periods of time. This hang up of the material may considerably reduce the working volume of the storage units. In other situations, the material may compact and solidify to the extent that little of any of the material escapes from the storage unit when the lower portion is opened. Other instances involve a channel in the material forming what is commonly referred to as "rat holeing". An extreme situation is where the material completely plugs the entire cross-section of the storage unit.

Many devices have been provided for assisting in unloading of storage units, such as bins, silos and the like. The common devices used are vibrator elements and/or air blasters which are normally attached to the wall of the silo to loosen the material and assist in bottom discharge from the silo. Other devices use a power driven motor which has a rotary attachment for striking the material hung up in the silo to loosen it and encourage its removal from the silo. These devices are normally lowered by hand from the upper portion of the silo. Should an avalanche occur and trap the power driven motor drawing it downwardly and exerting stress on the silo roof, this can result in the problem of roof collapse if the cable supporting the motor is in some way secured to the roof.

In many instances, the silos contain explosive materials such as coal dust fins, or toxic materials such as cement dust and detergents to name only a few. It can become hazardous for the operator to be present on top of the silo to manually maneouvre devices for lowering through the top of the silo to clean out the hung up material.

According to this invention, apparatus is provided which controls the operation of devices lowered through the top of the silo for cleaning out of the hung up material without requiring the presence of operators at all times.

SUMMARY OF THE INVENTION

An appratus for cleaning out material which remains within a confined space comprises a power driven means for impacting the material to loosen the material and allow it to fall downwardly of the confined space. Means is provided for suspending the impacting means from above the material in the confined space and supplying power to the impacting device. A drum is supported above the material in the confined space about which the suspension/power means is wound. The drum is rotatable to pay out or rewind the suspension/power means in positioning the impacting means in the area of the material in the confined space.

According to an aspect of the invention, means is provided for sensing tension in the suspension/power means and enabling a drive means for rotating the drum to allow the drum to pay out freely the suspension/power means when sensed tension exceeds a predetermined level. Thus, in situations where the hung up material avalanches and envelopes the impacting means, the suspension/power means is allowed to pay out freely to avoid damage to the suspension/power means and the structure for supporting the drum above the material in the confined space.

According to another aspect of the invention, means is provided for controlling a drive means for rotating the drum. The control means is adapted to effect reciprocal rotary movement in the drum by controlling the drive means to alternate direction of the drive on the drum and thereby raise and lower the impacting means along the material. In this manner, a greater area of the material face is impacted and loosened during automatic reciprocation of the impacting device to thereby expedite clean out of the hung up material in the confined space.

BRIEF DESCRIPTION OF THE DRAWINGS

Preferred embodiments of the invention are shown in the drawings wherein.

DETAILED DESCRIPTION OF THE PREFERRED EMBODIMENTS

Clogged storage devices, such as silos, bins, tanks, hoppers and the like is a common problem. Relief of the clogging can, however, be difficult to solve. In most instances, it is impossible or hazardous to lower a working crew into the silo to clear out the material which is hung up on the side walls. The working environment is usually explosive and toxic and the possibility of avalanche makes it impossible for work crews to enter the silo.

Figure 1:
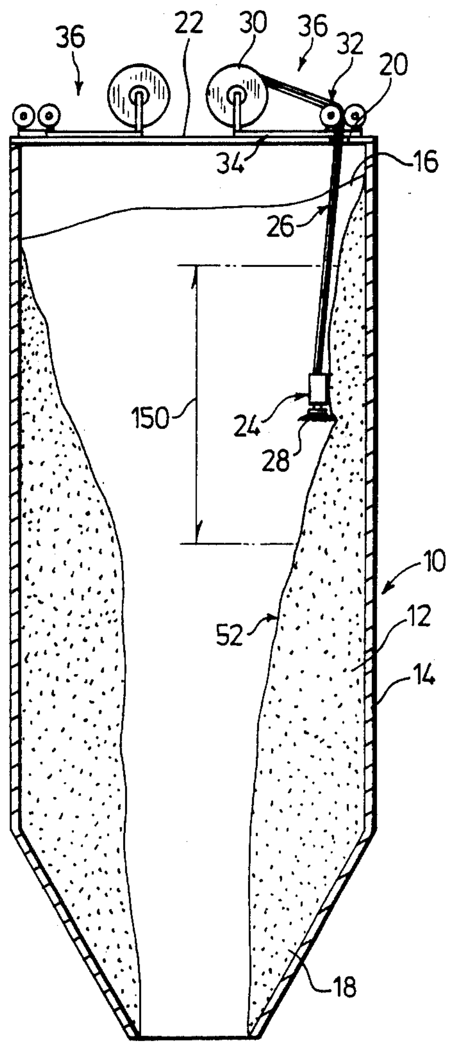
FIG. 1 is a section through a silo showing the impacting device in position to loosen material hung up in the silo.

As shown in FIG. 1, a silo 10, which may be 50 meters in height, has compacted material 12 hung up along the side wall 14 from the upper portion of the silo interior 16 which defines a storage space down to the conical area 18. According to this invention, in order to remove the compacted material a powered impacting device 24 is lowered through a manhole 20 in the silo roof 22. The impacting device is suspended from a means 26 which delivers power for operating the impacting device 28. It is understood that the means 26 for suspending and powering the impacting device 24 may be of many different configurations. The means 26 may be a flexible hose which is optionally reinforced, a load bearing wire cable in combination with a non-load bearing hose or wire for delivering power to the impacting device to name only a few. For purposes of discussing the preferred embodiment, reference will be made to a cable means which is wound onto a drum which will be referred to as a cable drum. The cable means 26 is reeled on a cable drum assembly 30, as passed over guide roller unit 32. The cable drum 30 is supported on structure 34 to provide a cable drum system 36. More than one cable drum system 36 may be provided on the silo roof 22, depending upon the extent of hang up of the compacted material within the silo 10.

Figure 2:
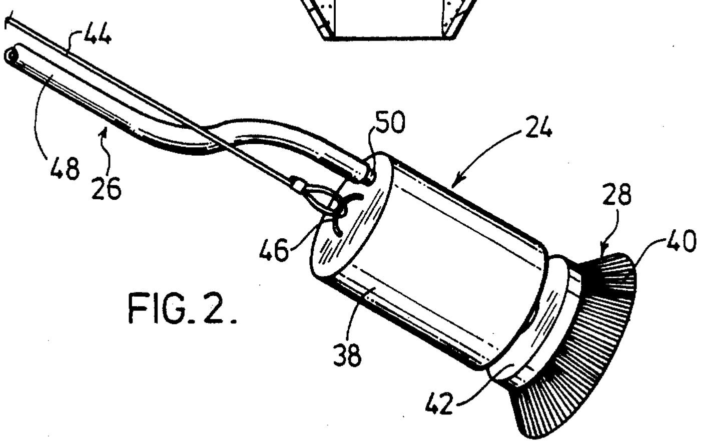
FIG. 2 is a perspective view of the impacting device as suspended from the cable.

As shown in more detail in FIG. 2, the impacting device 24 consists of a motor 38 with external driveshaft to which the striking devices 28 are connected. According to this embodiment, the striking devices 28 consist of a plurality of wire strands 40 which are secured to a disc 42. By way of the motor 38 rotating the disc 42 at high speeds, the wire strands 40 strike and thereby impact the material 12 in the silo to loosen the material. The cable means 26 consists of a braided wire cable 44 which is secured to a bolt eye 46 on the motor housing. This cable 44 serves to support the weight of the power driven impacting device 24. A non-load bearing hose 48 associated with suspension cable 44 is connected to the motor 38 by coupling 50. According to this embodiment of the invention, the motor 38 is fluid driven, preferably by a gas such as pressurized air. The pressurized air is delivered through flexible hose 48 to the motor to rotate it at high speeds. By proper positioning of the guide roller unit 32 on the roof 22 of the silo, the power driven impacting device 24 as suspended will react like a pendulum and move or swing towards the material 12. When driven, the whipping wires 40 on the end of disc 42 impact the material. This causes a bouncing action of the motor against the material to thereby provide a random impacting of the material across its face area generally designated 52 in the FIG. 1.

Figure 3:
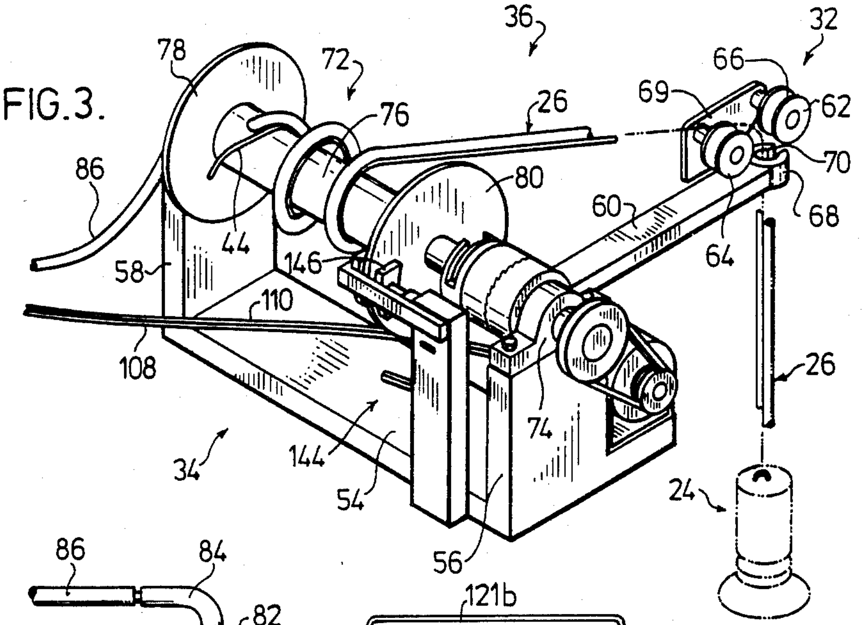
FIG. 3 is a perspective view of the drum and support structure which is mounted on top of the silo of FIG. 1.

The cable drum arrangement 36 is shown in more detail in FIG. 3. The structural frame 34 comprises a base 54 with upright side walls 56 and 58. Extending outwardly from the base 54 at approximately right angles is support member 60 for the guide roller arrangement 32. The guide roller unit 32 comprises two spaced-apart rollers 62 and 64 having grooved faces 66 to receive the cable means 26. At the end of member 60 is a ring 68 for directing the cable means 26 downwardly of the silo. The plate 67, on which the rollers 64 and 66 are mounted, is in turn mounted on a collar (not shown). The collar is bearingly mounted on ring 68. This allows the rollers 64 and 66 to swivel back and forth and thereby track the cable as it unwinds from or winds onto the drum during its traversing the drum. The ring 68 may be slotted at 70 to permit removal of the cable means 26 from the ring 68 and out of the cable guidance unit 32. This is advantageous when it is desired to remove the cable drum from the system 36 in a manner to be discussed with respect to FIG. 7.

The upright members 56 and 58 support the cable drum 72 which is rotatably mounted in bearings at each end as exemplified at 74. The cable drum 72 comprises a core 76 with spool plates 78 and 80 for retaining the wound cable on the drum 72.

Figure 4:
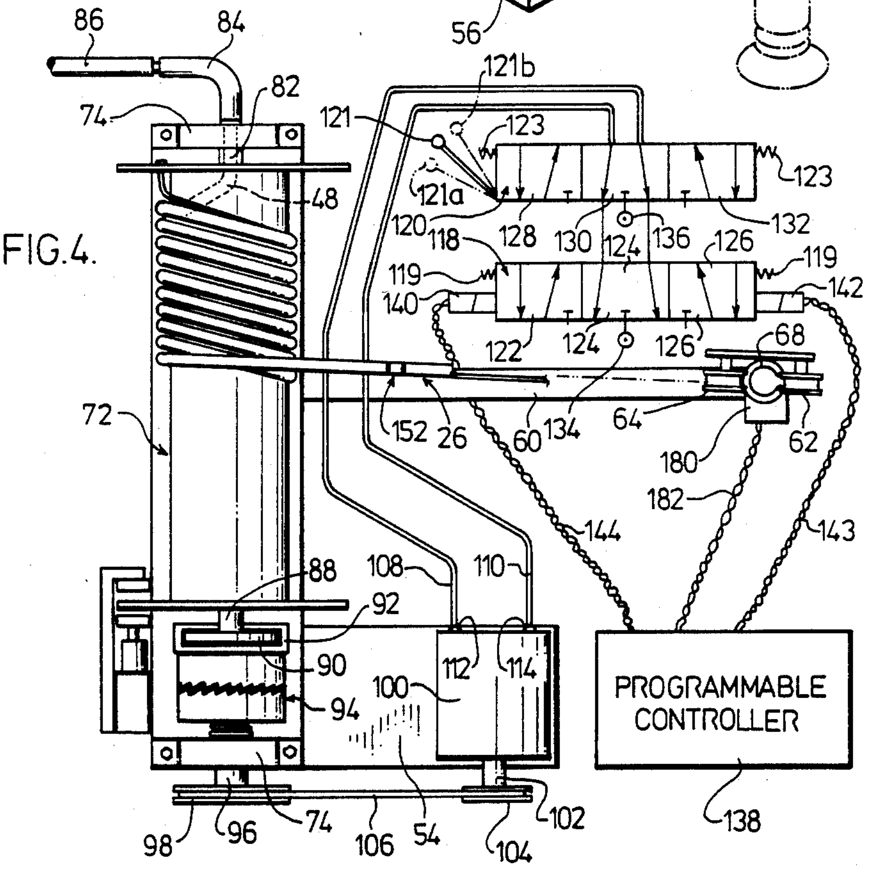
FIG. 4 is a top plan view of the drum and a schematic of the pneumatics for controlling the motor which drives the cable drum.
Figure 5:
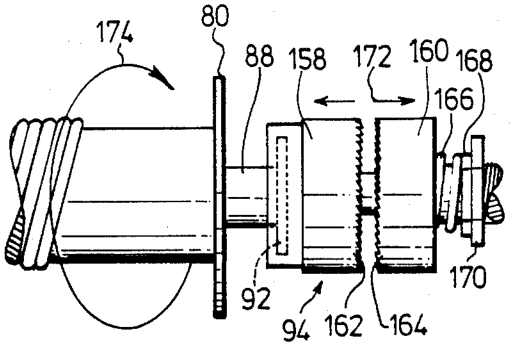
FIG. 5 is a partial view of the drum showing the slip clutch arrangement between drive motor and drum.

As shown in FIG. 4, the cable drum 72 has a first shaft 82 bearingly mounted in bearing 74 and through which the air hose 48 passes as releasably connected to hose 86 by a swivel joint 84. The hose 86 supplies pressurized air to the hose 48. The braided wire 44 is connected to spool plate 78 to complete the assembly of the cable means 26 to cable drum 72. The other end of the cable drum has a shaft 88 with a flange portion 90 which is shown in more detail in FIG. 5. The flange portion 90 is received in a pocket 92 and to which it is secured. A slip clutch 94 is secured to the pocket 92 and, in turn, is secured to shaft 96 which has mounted thereon a pulley 98. The motor 100 for driving the cable drum is mounted on the base portion 54. The motor has a driveshaft 102 with pulley 104 mounted thereon. A V-belt system 106 drivingly interconnects the motor 100 to the driveshaft 96 for the cable drum 72.

The motor 100, according to the preferred embodiment of this invention, is a reversible air driven motor with reduction gearing. This type of motor is readily available on the marketplace, for example it may be obtained from The Aro Corporation of Bryon, Ohio. Connected to the motor 100 are conduits 108 and 110 which deliver the pressurized air to either port 112 or 114 depending upon the direction in which the driveshaft 102 is to rotate. To control the flow of pressurized air through the conduits 108 and 110, a valve control system 116 is used. The valve system consists of two valve blocks 118 and 120. Each valve block is divided up into three valve components. With automatic controlled block 118, there are components 122, 124 and 126. With manual controlled block 120, there are components 128, 130 and 132. The pressurized air is supplied to block 118 via inlet 134. The pressurized air is supplied to block 120 via inlet 136. With valve components 124 and 130 aligned with conduits 108 and 110, it is clear that both pressurized lines 134 and 136 are blocked off and no pressure is applied to either conduit 108 or 110. The motor 100 is therefore in a neutral position. Springs 119 and 123 are provided to return the respective valve blocks 118 and 120 to their respective centre valve components 124 and 130 when the blocks are released from either automatic or manual control.

Block 120 is provided for manually controlling the system, whereas block 118 is provided for automatically controlling the system. Manual control is needed when it is desired to either payout or rewind the cable 26. An operator may stand at the top of the silo, for example of FIG. 1, and by manually moving the valve block 120 with handle schematically shown at 121, direct the cable to move the impacting device 24 to the desired location. By manually moving handle 121 to the position indicated in dot at 121*a*, valve component 128 is in controlling position, pressurized air is provided to conduit 108. This rotates the motor 100 in a direction which causes the cable drum 72 to pay out the cable 26. By manually moving the handle 121 to the position indicated in dot at 121*b*, component 132 is in the controlling position, pressurized air is provided in conduit 110 and exhausted through conduit 108. This causes the motor 100 to rotate in the opposite direction and rewind the cable 26 onto the drum.

Once the manual positioning of the impacting device on the face of the material is achieved, it may then be desirable to reciprocate the impacting device 24 vertically along the face 52 of the material as shown in FIG. 1. To accomplish this in an automatic manner, rather than manually reciprocating valve block 120, a programmable controller 138 is provided to control this reciprocal operation of the valve block 118. The programmable controller 138 may be any form of conventional programmable device which, based on time, can provide signals via leads 141 and 143 to electrical solenoids 140 and 142. When solenoid 140 is actuated by a signal from controller 138, a plunger is pressurized to move component 122 into controlling position. When solenoid 142 is actuated by controller 138, a plunger is similarly pressurized to move component 126 into controlling position. When both solenoids are in the deactivated condition, the springs 119 return valve component 124 to the controlling position. Various types of conventional controllers are usable, such as that sold under the trademark "CP-10" and obtainable from D.F. Controls Inc of Toronto, Canada. The programmable controller 138 may have a keyboard via which the variables for determining the time periods for up and down movements of the impacting device can be entered into the controller's memory.

Once use of the manual block 120 is completed in positioning the impacting device at the desired level in the silo, a brake 144 may be provided which is manually actuated to apply the brake pad 146 against spool plate 80 to hold the impacting device at the desired elevation within the silo. It is appreciated that, with various types of motors, the hand brake may not be required because of gearing and other components between the motor and the drum drive, the weight of the impacting device may not be sufficient to overcome the inertia of the motor and related drive to further unwind the drum once the desired position for the impacting device has been selected.

After the appropriate data is entered into the programmable controller, it is actuated to control either solenoid 140 or 142. The hand brake 144 is released and the solenoid 140 is actuated to place component valve 122 in position to supply compressed air in conduit 108 which causes the cable drum 72 to pay out cable 26. By virtue of the predetermined scheme programmed into the programmable controller, the solenoid 140 holds the valve 122 in position for a predetermined period of time. After expiry of that time period, the solenoid 140 is deactuated and solenoid 142 is actuated to place valve component 126 in controlling position and reverse the direction of motor 100 to cause reeling in of the cable 126 for a second period of time. Upon expiry of that second time period, the programmable controller will deactuate solenoid 142 and reactivate its second solenoid 140 thereby placing valve component 122 in controlling position to again reverse the direction of the motor 100 and pay out the cable. It is, therefore, apparent and as illustrated in FIG. 1, that by timing the up and down movements of the cable 26, the impacting device 24 may be moved along the face 52 of the material to cover, for example, the region as exemplified by arrow 150.

It is appreciated that the time periods, during which the valve components 122 and 126 remain in the operative position, is in direct relation to the speed at which the motor 100 is operated and the pressure of the air supplied to the motor. These parameters principally contribute in determining the rate at which the drum either pays out or reels in the cable 26. It should also be noted that, in order to assist the manual operation of the cable drum in determining the amount of cable that is either paid out or reeled in, the cable 26 can include markings 152 which may be located every meter or five meters on the cable so that the operator in manually controlling the system can observe and determine how much cable has been paid out or reeled in.

Figure 6:
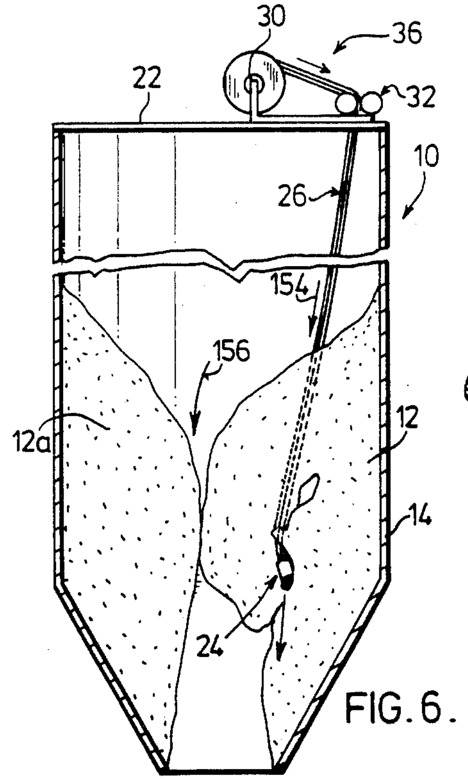
FIG. 6 is a section through the silo illustrating an avalanche of hung up material therein.

By use of the programmable controller in combination with the valving arrangement for reciprocating the impacting device, the operator does not have to attend regularly at the top of the silo. This is advantageous particularly in situations when conditions around the silo may be hazardous. The impacting device may be left to operate on the face of the material 52 for considerable time and during that operation while unattended, there is the possibility that the material 12, as loosened, may give way and avalanche in the manner shown in FIG. 6. This can trap the impacting device 24 and carry it downwardly in the direction of arrow 154 with the avalanching material 156. If the cable 26 is not free to pay out from drum 30, then considerable stress can be applied to the roof structure 22 of the silo and should the impacting device 24 be sufficiently trapped in the avalanching material which may lodge against remaining material **12*a* and plug the discharge area, it is possible that the roof structure 22 of the silo can be pulled into the silo with consequent loss of the complete cable drum system 36. A device is, therefore, provided on the cable drum assembly which senses the tension in the cable and enables the drive device for the cable drum to allow the drum to pay out freely the cable when the sensed tension exceeds a predetermined level. This sensing and releasing of the drive system for the cable drum may be accomplished in several ways. According to a preferred embodiment of the invention, as noted in FIG. 4, a slip clutch 94, as shown in more detail in FIG. 5, may be used. The slip clutch 94 comprises two components 158 and 160. Component 158 is secured to driveshaft 88 through pocket 92. Clutch component 160 is secured to shaft 96 which, in turn, has pulley 98 mounted thereon. To provide for varying degrees of frictional engagement between the faces 162 and 164 of the slip clutch, an adjustable compression spring 166 is provided. To adjust the compression of the spring against component 160, an adjustable nut 168 is provided for threading on shaft 96. Once the desired compression of spring 166 on component 160 is achieved, a lock nut 170 is used to hold the position of nut 168 on shaft 96. Thereby, compression spring 166 determines the frictional engagement between faces 162 and 164 and in turn senses when the tension in the cable has exceeded a predetermined level. The faces 162 and 164 may be modified by mating ratchet teeth which ensure a positive engagement of the clutch in the direction of rotation 174 of the cable drum which pays out the cable. By adjusting force on the compression spring 166, the frictional engagement between the faces is adjusted so that when tension in the cable exceeds a predetermined maximum as set by the spring device, the clutch faces 162, 164 will slip over each other by way of the components 158 and 160 separating in the direction of arrows 172**.

With this slip clutch arrangement, when an avalanche occurs and tension in the cable 26 exceeds a maximum while the motor 100 is in the standard mode of operation, the slip clutch will release and allow the cable drum 30 to pay out freely the cable 26 so that the power driven impacting device is free to fall with the material 12 without damaging the roof structure or the cable and cable drive arrangement.

Figure 7:
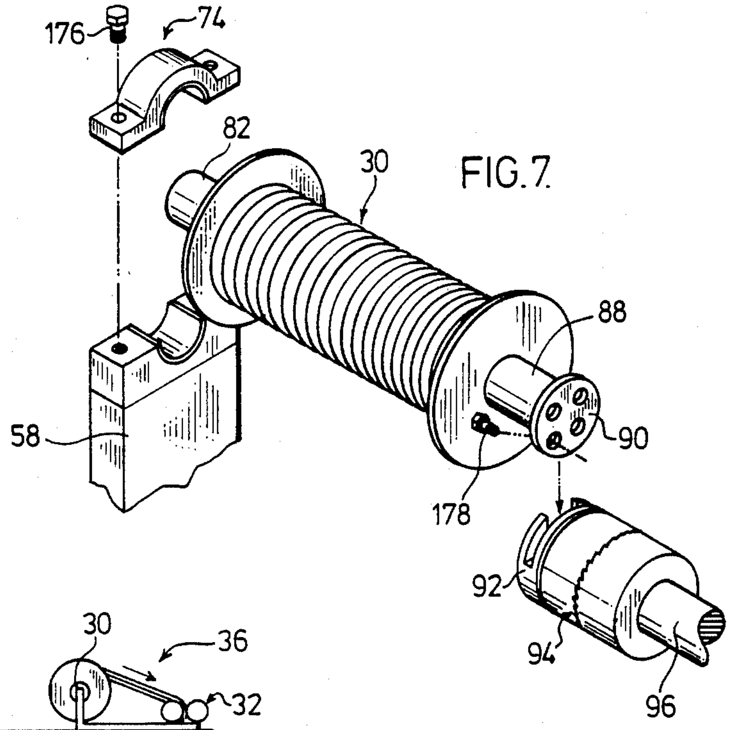
FIG. 7 shows components of the drum to provide for quick release of the drum from the support structure.

Turning to FIG. 7, the cable drum 30 may be disconnected from the base arrangement 34 removing bolts 176 to allow opening of the split bearing 74. This releases shaft 82 of the cable drum from upright portion 58. On the other side of the system to remove shaft 88 from the slip clutch, bolts 178 are removed from plate 90 so that the flange plate 90 may be removed from pocket 92. This is beneficial in situations where retrieval of the impacting device 24 after an avalanche has occurred, is impossible or very difficult. In this situation, the cable drum is removed and allowed to rest on the roof of the silo. Thus the provision of the slot 70 in the ring 68 of the cable guide unit to allow use of the cable drum drive in another location of the silo with a new cable drum and power driven impacting device.

A cable drum system for storage unit cleaning devices provides for unassisted, automatic operation and accommodates emergency situations where avalanches may occur in the silo. It is appreciated that there are many alternatives to impacting device 24, the cable arrangement, cable drum feed, controls for the motor in driving the cable drum and in accommodating avalanches. As shown in FIG. 4, an alternative embodiment, which may be used in combination with the mechanical slip clutch 94, is a tensiometer 180 which measures the tension in the cable 26 as it passes through ring 68. The tensiometer may be of the type which senses tension in the cable by sensing movement in wheel 64 can be spring mounted in a guide. As tension in the cable increases, the wheel 64 moves away from wheel 62 along the guide. The degree of movement in wheel 64 can be monitored and when movement exceeds a preset extent due to a maximum tension in the cable 26, tensionmeter 180 is tripped to signal the programmable controller via electrical leads 182. When the tensiometer 180 senses tension in the cable 26 which exceeds a predetermined maximum and emits a signal in lead 182, the programmable controller 138 may be programmed to override the automatic reciprocation produced by the valve block 118 and deactivate both solenoids 140 and 142 to immediately move by springs 118 valve component 124 into the operative position. With the hand brake 144 in the "off" position during automatic reciprocal operation of the cable drum, and with the valve component 124 in the operative mode, the motor 100 is free to rotate in either direction. Thus, when the tensiometer senses a tension in the cable exceeding the predetermined maximum, the cable drum is then free to pay out the cable since the motor 100 is in the neutral position. As mentioned, the mechanical clutch 94 may be used in place of the tensiometer/controller arrangement or in combination where the mechanical clutch would be used as a back up to the programmable controller should it fail due to a loss of power or like circumstance.

It is understood that the motor 100 may be driven by other pressurized fluids, such as hydraulic fluid or steam. Similarly, the impacting device 24 may be driven by hydraulic fluid or steam as delivered through the hose portion 48. In that situation, a second recycle hose may be provided. If the motor 38 for the impacting device 24 is electrically driven, it is understood that in place of the hose 48 an electrical cable may be used with the braided cable 44 to power the electrical motor. Similarly, should an electrical motor be used in place of the pneumatic motor 100, a relay arrangement may be provided for controlling the operation of the electrical motor including an override in association with the tensiometer to remove all power from the electric motor when an avalanche ocurrs and is sensed. This would allow the cable drum to freely pay out the cable, so that the impacting device may ride downwardly with the avalanching material.

It is also understood that variations to the mechanical slip clutch may be provided in varying the frictional engagement between the faces of the slip clutch to set the predetermined maximum tension in the cable which, when exceeded, releases the cable drum from the drive system to allow the cable drum to freely pay out the cable. It is also understood that reinforced hose may be used in suspending the impacting device from the cable drum. In this manner, a pressurized fluid system is useful where reinforcing braiding within the hose provides both the strength for suspending the impacting device and powering it. It is also understood that a transmission may be used in place of the valving arrangement for the pneumatic motor 100. The transmission would be connected between the motor 100 and the driveshaft 96 of the drive arrangement. The transmission can be of the type which, by simply changing gears, changes the direction of rotation of the cable drum to provide the desired reciprocation of the cable drum to move the powered impacting device up and down along the face of the material to be loosened.

Although preferred embodiments of the invention have been described herein in detail, it will be understood by those skilled in the art that variations may be made thereto without departing from the spirit of the invention or the scope of the appended claims.

The embodiments of the invention in which an exclusive property or privilege is claimed are defined as follows:

1. An apparatus for cleaning out material which remains within a storage area of a silo or the like, said apparatus comprising a power driven means for impacting said material, to loosen the material and allow it to fall downwardly of said storage area; means for suspending said impacting means from above said material in said silo and supplying power to said impacting means; said suspension/power means being sufficiently flexible to permit swinging movement of said impacting means about said storage area within said silo; a drum supported from a roof for said silo above said material in said silo about which said suspension/power means is wound, drive means for rotating said drum to pay out or rewind said suspension/power means in positioning said impacting means in the area of said material to reciprocate thereby said impacting means along a face of said material.

2. An apparatus of claim 1, wherein said suspension/-power means comprises a flexible reinforced hose for supplying pressurized fluid to and for driving said impacting means.

3. An apparatus of claim 1, wherein said suspension/-power means comprises flexible cable for suspending said impacting means and a non-load bearing power transport cable for supplying power to said impacting means.

4. An apparatus of claim 1, wherein said power driven impacting means comprises means for impacting said material and means for driving said impacting means.

5. An apparatus of claim 1, wherein means senses tension in said suspension/power means and enables said drive means to allow said drum to pay out freely said suspension/power means when sensed tension exceeds a predetermined level.

6. An apparatus of claim 1, wherein means controls said drive means in rotating said drum, said control means being adapted to effect reciprocal rotary movement in said drum by controlling said drive means to alternate direction of drive on said drum and thereby raise and lower said suspension/power means and said impacting means along said material.

7. An apparatus of claim 5, wherein said sensing means releases said drive means when sensed suspension/power means tension exceeds said predetermined level.

8. An apparatus of claim 7, wherein said drive means is positively connected to said drum, said drive means being free to rotate in response to said sensing means releasing said drive means.

9. An apparatus of claim 8, wherein said drive means is driven by fluid pressure, said sensing means actuating a valve means to remove pressurized fluid on said drive means in response to sensing tension in said suspension/-power means above said predetermined level.

10. An apparatus of claim 7, wherein said drive means includes a motor and means interconnected between said motor and said drum for releasing said motor from said drum in response to said sensing means sensing a tension in said suspension/power means in excess of said predetermined level.

11. An apparatus of claim 10, wherein said release means is a slip clutch and said sensing means is a spring-loaded device for setting the degree of frictional engagement on said slip clutch, said spring-loaded device allowing said clutch to slip once tension in said suspension/power means exceeds the frictional engagement of said clutch as determined by said spring-loaded device.

12. An apparatus of claim 8, wherein said drive means is driven by electricity, said suspension/power means comprising a flexible cable for suspending said impacting means and a non-load bearing cable for supplying power to said drive means, said sensing means actuating an electrical switch to remove electricity from said drive means in response to sensing tension in said cable means above said predetermined level.

13. An apparatus of claim 6, wherein said drive means includes a transmission connected between a motor and said drum, said control means controlling said transmission to alternate the direction of rotation of said drum.

14. An apparatus of claim 6, wherein said drive means includes a motor which is engaged with said drum for rotating it, said motor being powered by pressurized fluid delivered to said motor by a conduit means, said motor having a first port and a second port, said control means alternating pressurized fluid to said first port and second port of said motor to alternate the direction of rotation of said motor and thereby effect reciprocation of said impacting means along said material.

15. An apparatus of claim 14, wherein said control means is associated with said drum and comprising a multi-valve device and a programmable device for operating said multi-valve device, said multi-valve device having at least two valves and an actuator means for selectively actuating said at least two valves in accordance with a predetermined scheme of said programmable device, said multi-valve device being connected by said conduit means to said first port and second port of said motor whereby said actuating means actuating the first valve to rotate said motor in a first direction to in turn unreel said suspension/power means from said drum and said actuating means subsequently actuating the second valve to rotate said motor in a second opposite direction to in turn reel said suspension/power means onto said drum, said programmable device being programmed to time the period of actuation of the first and second valves to determine thereby the reciprocal movement of said impacting means along said material.

16. An apparatus of claim 15, wherein said multi-valve device comprises a third valve which removes pressurized air from said motor and allows it to rotate freely, means for sensing tension in said suspension/-power means and upon said tension exceeding a predetermined maximum, said sensing means overriding said programmable device and signalling said actuator means to actuate said third valve thereby allowing said motor to rotate freely to in turn allow said drum to pay out hose and relieve the sensed tension in said hose.

17. An apparatus of claim 6, wherein means senses tension in said suspension/power means and enables said drive means to allow said drum to pay out freely said suspension/power means when sensed tension exceeds a predetermined level.

18. An apparatus of claim 14, wherein means senses tension in said suspension/power means and enables said drive means to allow said suspension/power drum to pay out freely said suspension/power means when sensed tension exceeds a predetermined level.

19. An apparatus of claim 17 or 18, wherein said sensing means releases said drive means when sensed tension exceeds said predetermined level.

20. An apparatus of claim 17 or 18, wherein said sensing means releases said drive means when sensed tension exceeds said predetermined level, said drive means is positively connected to said drum, said drive means running freely in response to said sensing means releasing said drive means.

21. An apparatus of claim 17 or 18, wherein said sensing means releases said drive means when sensed tension exceeds said predetermined level, said drive means includes a motor and means interconnected between said motor and said drum for releasing said motor from said drum in response to said sensing means sensing a tension in said suspension/power means in excess of said predetermined level.

22. An apparatus of claim 17 or 18, wherein said sensing means releases said drive means when sensed tension exceeds said predetermined level, said drive means includes a motor and means interconnected between said motor and said suspension/power drum for releasing said motor from said drum in response to said sensing means sensing a tension in said suspension/-power means in excess of said predetermined level, said release means is a slip clutch and said sensing means is a spring-loaded device for setting the degree of frictional engagement on said slip clutch, said clutch slipping once tension in said suspension/power means exceeds the frictional engagement of said clutch as set by said spring-loaded device.

* * * * *